United States Patent
Dazé et al.

(10) Patent No.: US 11,023,515 B2
(45) Date of Patent: Jun. 1, 2021

(54) INFOTAINMENT BASED ON VEHICLE NAVIGATION DATA

(71) Applicant: Faraday & Future Inc., Gardena, CA (US)

(72) Inventors: Nicholas William Dazé, Manhattan Beach, CA (US); Matthew Joseph Coburn, Milford, MI (US); Eric Ryan Evenchick, Toronto (CA); Sethu Hareesh Kolluru, Fremont, CA (US); Luke Michael Ekkizogloy, Mountain View, CA (US); Carlos John Rosario, San Jose, CA (US); Xiufeng Song, San Jose, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 15/780,232

(22) PCT Filed: Nov. 30, 2016

(86) PCT No.: PCT/US2016/064086
§ 371 (c)(1),
(2) Date: May 30, 2018

(87) PCT Pub. No.: WO2017/095852
PCT Pub. Date: Jun. 8, 2017

(65) Prior Publication Data
US 2018/0357233 A1    Dec. 13, 2018

Related U.S. Application Data

(60) Provisional application No. 62/261,226, filed on Nov. 30, 2015, provisional application No. 62/367,637,
(Continued)

(51) Int. Cl.
*A63F 13/25* (2014.01)
*G06F 16/435* (2019.01)
(Continued)

(52) U.S. Cl.
CPC ............ *G06F 16/435* (2019.01); *A63F 13/25* (2014.09); *A63F 13/90* (2014.09);
(Continued)

(58) Field of Classification Search
CPC ...... G06F 16/435; G06F 16/44; G06F 3/0481; A63F 13/25; A63F 13/90; G01C 21/3476;
(Continued)

(56) References Cited

U.S. PATENT DOCUMENTS

2002/0103598 A1* 8/2002 Nakamoto ............ G01C 21/26
701/408
2002/0188390 A1  12/2002 Ichihara et al.
(Continued)

FOREIGN PATENT DOCUMENTS

JP   2004-217188 A    8/2004
JP   2008-090509 A    4/2008
(Continued)

OTHER PUBLICATIONS

International Search Report dated Mar. 15, 2017 for International Application No. PCT/US2016/064086.

*Primary Examiner* — Corbett B Coburn
(74) *Attorney, Agent, or Firm* — Veros Legal Solutions LLP

(57) ABSTRACT

A system for providing media content to an occupant of a vehicle may include a user interface configured to provide the media content to the occupant and a controller coupled to the user interface and to a database configured to store media content. The controller may be configured to receive vehicle navigation data, select a subset of media content
(Continued)

from the media content stored in the database based on the vehicle navigation data, and provide the subset of media content through the user interface.

13 Claims, 9 Drawing Sheets

Related U.S. Application Data filed on Jul. 27, 2016, provisional application No. 62/367,628, filed on Jul. 27, 2016.

(51) Int. Cl.
| | |
|---|---|
| *G06F 16/44* | (2019.01) |
| *H04L 29/08* | (2006.01) |
| *G01C 21/36* | (2006.01) |
| *H04L 29/10* | (2006.01) |
| *H04L 12/40* | (2006.01) |
| *A63F 13/90* | (2014.01) |
| *G01C 21/34* | (2006.01) |
| *G09B 5/06* | (2006.01) |
| *G06F 3/0481* | (2013.01) |

(52) U.S. Cl.
CPC ......... *G01C 21/3476* (2013.01); *G01C 21/36* (2013.01); *G06F 16/44* (2019.01); *G09B 5/06* (2013.01); *H04L 12/40* (2013.01); *H04L 29/08* (2013.01); *H04L 29/10* (2013.01); *H04L 67/12* (2013.01); *H04L 67/2804* (2013.01); *H04L 67/36* (2013.01); *G06F 3/0481* (2013.01)

(58) Field of Classification Search
CPC ........... G01C 21/36; G09B 5/06; H04L 12/40; H04L 29/08; H04L 29/10; H04L 67/12; H04L 67/2804; H04L 67/36
See application file for complete search history.

(56) References Cited

U.S. PATENT DOCUMENTS

| | | | | |
|---|---|---|---|---|
| 2008/0189319 | A1* | 8/2008 | Nielen | G11B 27/102 |
| 2009/0006194 | A1* | 1/2009 | Sridharan | G06Q 30/02 |
| | | | | 705/14.62 |
| 2010/0110314 | A1* | 5/2010 | Kusano | G01C 21/3667 |
| | | | | 348/837 |
| 2010/0312369 | A1* | 12/2010 | Dollar, Jr. | G06F 16/68 |
| | | | | 700/94 |
| 2011/0130172 | A1* | 6/2011 | Rao | H04L 67/42 |
| | | | | 455/566 |
| 2013/0074111 | A1* | 3/2013 | Hyde | H04N 21/2146 |
| | | | | 725/25 |
| 2013/0074112 | A1* | 3/2013 | Hyde | H04N 21/2146 |
| | | | | 725/25 |
| 2013/0074115 | A1* | 3/2013 | Hyde | H04N 21/41422 |
| | | | | 725/30 |
| 2013/0200991 | A1* | 8/2013 | Ricci | B60K 35/00 |
| | | | | 340/4.3 |
| 2014/0281971 | A1* | 9/2014 | Isbell, III | G11B 27/034 |
| | | | | 715/716 |
| 2014/0298169 | A1* | 10/2014 | Williams | H04N 21/25841 |
| | | | | 715/716 |
| 2015/0254051 | A1* | 9/2015 | Panguluri | G06F 3/16 |
| | | | | 700/94 |
| 2015/0363830 | A1* | 12/2015 | Abuelsaad | G06Q 30/0266 |
| | | | | 705/14.63 |
| 2017/0137032 | A1* | 5/2017 | Wuthnow | B60W 40/08 |

FOREIGN PATENT DOCUMENTS

| | | |
|---|---|---|
| JP | 2015-154852 A | 8/2015 |
| KR | 10-1190543 B1 | 10/2012 |

* cited by examiner

INFOTAINMENT BASED ON VEHICLE NAVIGATION DATA

CROSS-REFERENCE TO RELATED APPLICATIONS

This application is a National Phase application under 35 U.S.C. § 371 of International Application No. PCT/US2016/064086, filed on Nov. 30, 2016, and claims the benefit of U.S. Provisional Application No. 62/261,226, filed on Nov. 30, 2015, 62/367,628, filed on Jul. 27, 2016, and 62/367,637, filed on Jul. 27, 2016. The subject matter of each of the aforementioned applications is incorporated herein by reference.

TECHNICAL FIELD

The present disclosure relates generally to an infotainment system for a vehicle, and more particularly, to methods and systems for selecting, organizing, and providing content based on vehicle parameters.

BACKGROUND

Listening to or watching media content while traveling may be pleasant for vehicle occupants. Radio programs are available on a variety of topics, but these programs often alternate media content with advertisements and fundraising drives. Similarly, though media content such as educational learning modules, music, podcasts, audio books, and videos may be available for download, selecting a subset of media content for a trip prior to the trip is time-consuming, and selecting content during a trip may be dangerous if done by the vehicle driver. Further, even if media content is available via the radio or is selected in advance of a trip, the media content may conclude before the trip does, leaving occupants bored, or may finish after the trip, requiring vehicle occupants to wait to conclude the media content. For example, if an hour long podcast is selected for a forty-five minute long trip, the occupant has to either sit in the vehicle for an additional fifteen minutes or stop the podcast and listen to the remaining portion at a later time. The interruption may require restarting the podcast because of the narrative-type nature.

Media onboard of a vehicle is typically organized based on common metadata, such as in alphabetical order according to the file name, in increasing/decreasing size of the file, or sorted by the artist/creator. These methods of organizing information are quite useful in many contexts, but they are fundamentally computer-centric, sorting information unimaginatively by the metadata that is attributed to the files themselves. It would be desirable to select, organize, and provide content to an occupant of the vehicle more intelligently based on vehicle specific parameters.

Further, while entertainment may be available during vehicle trips, radio programs may be punctuated with fundraising drives and commercials. Playing games while traveling may be pleasant for vehicle occupants, but often games take more or less time than a given trip leaving occupants bored or requiring them to quit in the middle of the game. Unexpected termination of a video game may potentially impact user experience, such as causing the occupant to lose experience points or suffer other consequences in the game.

The disclosed infotainment system is directed to addressing one or more of the possible drawbacks discussed above and/or other problems of the prior art.

SUMMARY

One aspect of the present disclosure is directed to a system for providing media content to an occupant of a vehicle. The system may include a user interface configured to provide media content to the occupant and a controller coupled to the user interface and a database configured to store media content. The controller may be configured to receive vehicle navigation data, select a subset of media content from the media content stored in the database based on the vehicle navigation data, and provide the subset of media content through the user interface.

Another aspect of the present disclosure is directed to a system for providing media content to an occupant of a vehicle. The system may include a sensor configured to detect a scene in the proximity of the vehicle, and a controller coupled to a database configured to store media content, the user interface, and the sensor. The controller may be configured to select a subset of media content from the media content stored in the database based on the subject matter of the scene and provide the subset of media content through the user interface.

Yet another aspect of the present disclosure is directed to a method for providing media content to an occupant of a vehicle. The method may include receiving vehicle navigation data, selecting a subset of media content from the media content stored in the database based on the vehicle navigation data, and providing the subset of media content through the user interface.

DETAILED DESCRIPTION

The disclosure is generally directed to an infotainment system for providing media content to an occupant of a vehicle. In some embodiments, the infotainment system may include a user interface and a controller. Via the controller, the infotainment system may select a subset of media content from media content stored in a database based on one or more of vehicle navigation data, the identities of vehicle occupants, places of interest the vehicle is approaching, and/or scenes in the proximity of the vehicle. The infotainment system may also interact with other stationary or mobile entertainment or infotainment systems.

This disclosure is also directed to systems and methods for selecting, organizing, and providing content based on vehicle parameters. The systems and methods may be applied to many different applications, such as a user interface in a moving vehicle. For example, the systems of the disclosure may be configured to receive a destination for a trip, estimate the duration of the trip, and provide media content based on the estimated trip duration. Organizing the media content based on vehicle parameters may dramatically decrease interruptions of consumption and decrease the time spent and cognitive load of the occupant searching for content to play at the beginning of a trip.

The systems and methods may be applied to many types of vehicles, such as automobiles, trains, planes, and boats. The disclosure may also be applied to mobile devices outside of the vehicle context, such as smart phones, tablets, e-readers, and wearables (e.g., smart watches and smart glasses). The media content may include audio and/or video media. For example, the audio media may include audio podcasts, audio books, radio, advertisements, learning materials, and/or music. The video media may include video podcasts, television shows, Internet videos, advertisements, video games, and/or movies.

Figure 1:
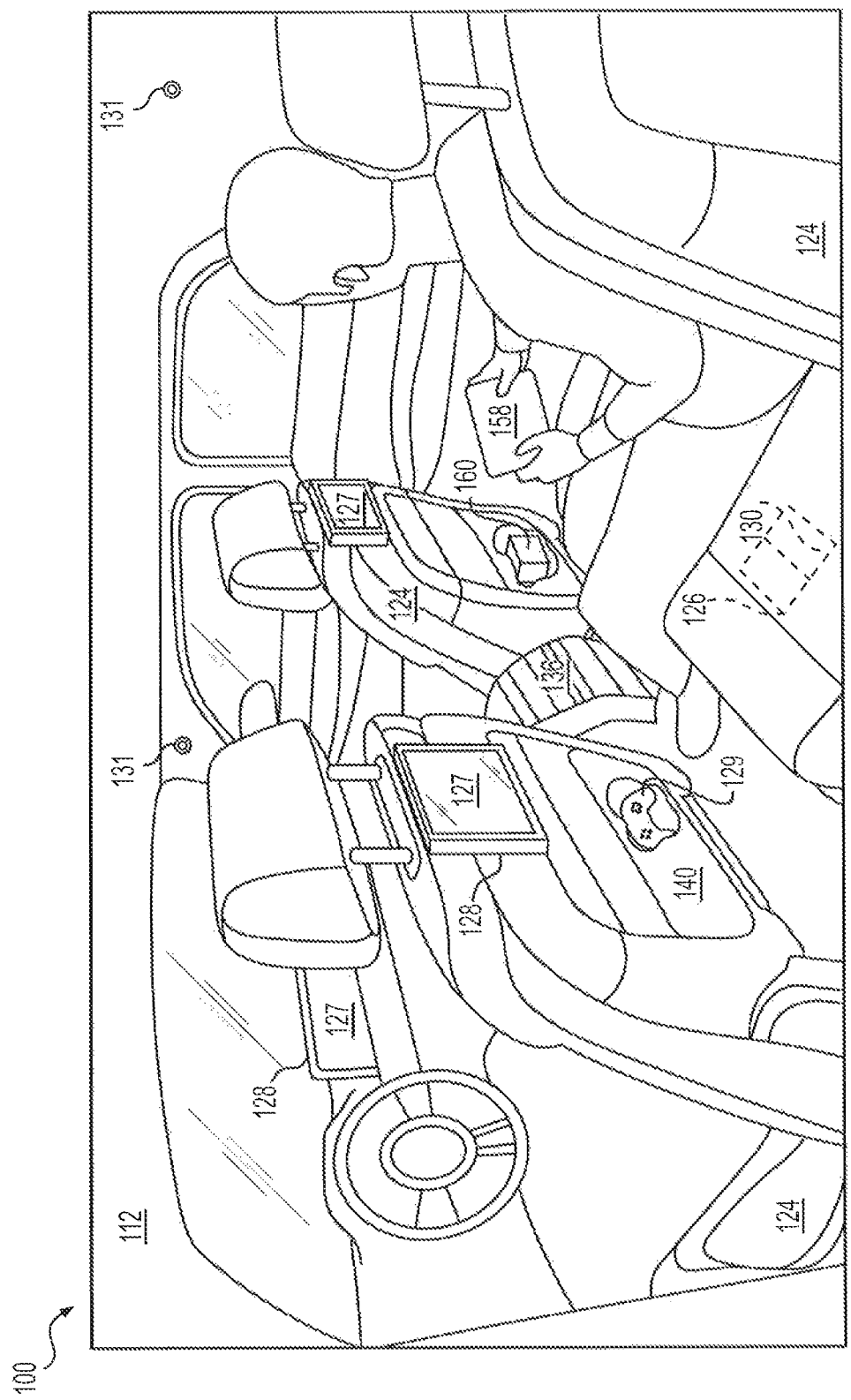
FIG. 1 is a diagrammatic illustration of a first exemplary infotainment system, according to an exemplary embodiment of the disclosure.

FIG. 1 is a diagrammatic illustration of an exemplary system 100 for providing media content to an occupant of exemplary vehicle 112. Vehicle 112 may have any body style, such as a sports car, a coupe, a sedan, a pick-up truck, a station wagon, a sports utility vehicle (SUV), a minivan, a conversion van, a bus, or a commercial truck. Vehicle 112 may be an electric vehicle, a fuel cell vehicle, a hybrid vehicle, or a conventional internal combustion engine vehicle. Vehicle 112 may be configured to be operated by a driver occupying vehicle 112, to be remotely controlled, and/or to be autonomously controlled. As illustrated in FIG. 1, vehicle 112 may further include a plurality of seats 124 to accommodate occupants of the vehicle.

User interface 128 may be configured to provide media content to an occupant of vehicle 112 while on-board vehicle 112. User interface 128 may be coupled to controller 130 by wired or wireless methods, e.g., via communication cables, wired or wireless networks such as radio waves, a nationwide cellular network, and/or a local wireless network (e.g., Bluetooth™ or WiFi), or other communication methods.

User interface 128 may include display 127 through which the media content may be provided. Display 127 may be, for example, installed on the back of seats 124, on the floor or ceiling of vehicle 112, side panels of vehicle 112, or any other suitable place. Display 127 may include an LCD, an LED, a plasma display, a projection, or any other type of display, and may also include microphones, speakers, and/or audio input/outputs (e.g., headphone jacks) or may be coupled to an audio system of vehicle 112. In addition, an occupant of vehicle 112 may carry one or more mobile devices 158, such as a mobile phone, a laptop, or a tablet, which may have alternative or additional displays that may be used in conjunction with user interface 128.

Additionally, user interface 128 may also be configured to accept input or commands from vehicle occupants. For example, user interface 128 may also provide a graphical user interface (GUI) presented on the display for the occupant to provide input, and may be configured to send occupant input to controller 130. Alternatively or in addition, user interface 128 may include input device 129 which may be configured to send occupant input to controller 130, such as buttons disposed on user interface 128 or separate touchscreens, joysticks, keyboards, and/or a tracker balls. Input device 129 may also be a mobile device 158 associated with a vehicle occupant. In embodiments in which separate input devices 129 are used, one or more input devices 129 may be housed in a housing 140 within vehicle 112, as shown in FIG. 1.

In some embodiments, input devices 129 may include gaming equipment, such as a gaming console, gaming control stick, headphone, microphone, goggle, gloves, glasses, bracelet, toy gun, etc. Input devices 129 may provide haptic feedback when an occupant plays a game. For example, in a racing game, input devices 129 may shake as the occupant drives the vehicle in the game over a bump. Input devices 129 may also provide an augmented reality or virtual reality experience to the occupant while playing the video game. In some embodiments, input devices 129 may include a touch screen window, as described above. For example, a user may play a game wherein the game includes augmented reality. In some embodiments, images displayed on a window may be based on information acquired by one or more cameras included in a vehicle (e.g., cameras that can capture one or more images of the surroundings of a vehicle). A window may display one or more images on one or more windows (including a windshield). Images shown on a window may be based at least in part on information acquired by the one or more cameras. A user may interact with the one or more windows by touching an image displayed on the window. For example, a user may touch a window and appear to be coloring objects outside of the car. As another example, an audio system may produce the name of an object (e.g., a house), and the user may press a portion of the window that corresponds with a physical house outside of the vehicle. In yet another example, a window may display a game including a ball (e.g., a pokeball) which the user may touch, and in response to that touch the ball may appear to open and capture a dragon that is displayed on the window and appears to a user to be in a real tree external to the vehicle.

In embodiments in which input devices are separate from user interface 128 are used, input devices 129 may be housed in a housing 140 within vehicle 112, as shown in FIG. 1. Controller 130 may be coupled to a drive associated with housing 140, and may send a signal to the drive deploying the input devices when the video game begins and/or when system 100 turns on. For example, the door of housing 140 may automatically pop open. In some embodiments, different gaming equipment may be stored in different compartments, and the compartment storing the equipment corresponding to a particular scene or user interaction may be open. For example, the compartment storing a toy gun may be open when the video game comes to a point that the player needs to use a gun to shoot or when a game requiring the toy gun is initiated.

User interface 128 may be fixed or movable, and may be turned on and off. For example, it is contemplated that user interface 128 may be disposed on a window, such that the window acts as a display when infotainment system 100 is in use, and reverts to clear or opaque glass when infotainment system 100 is not in use. Similarly, user interface 128 may fold, roll, or slide away. It is also contemplated that user interface 128 may be moved within the vehicle, and that infotainment system 100 may include multiple user interfaces 128, as shown in FIG. 1. In embodiments including multiple user interfaces 128, each user interface 128 may provide different subsets of media content or the same subset of media content. In embodiments including multiple user interfaces 128, each user interface 128 may provide different media content or the same media content.

Figure 2:
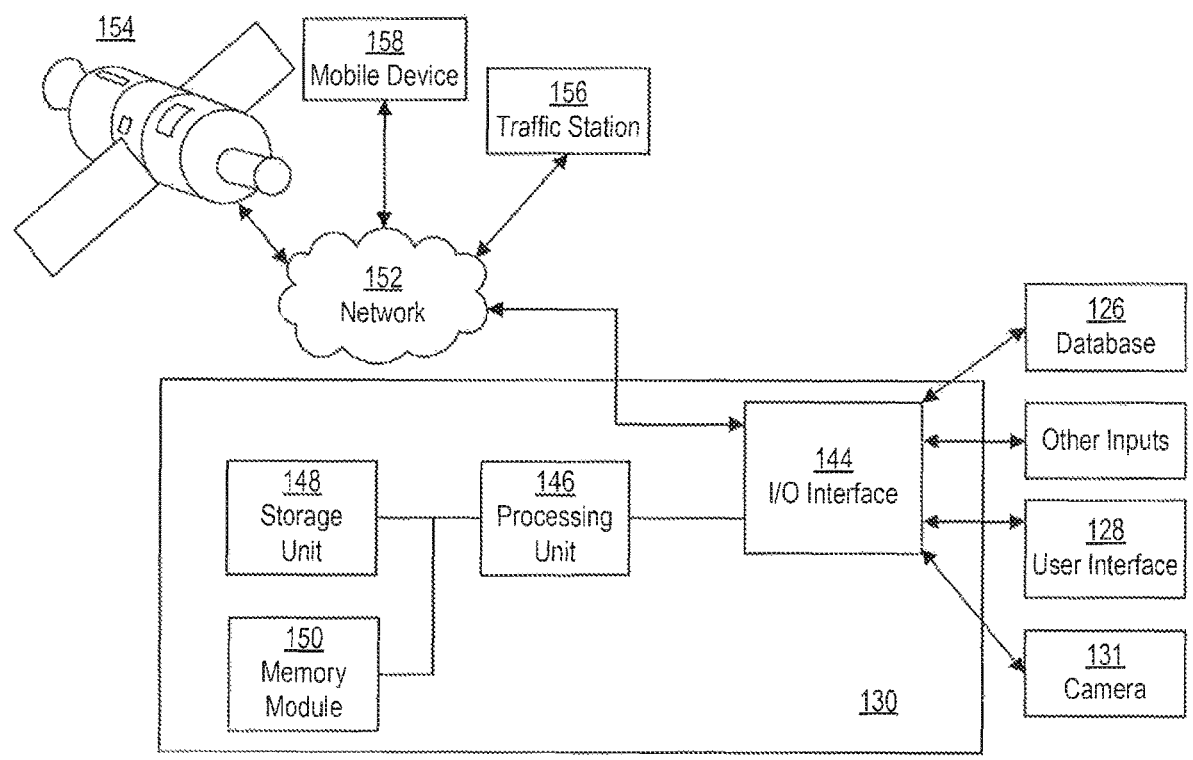
FIG. 2 is a block diagram of a network including a controller that may be used with an exemplary infotainment system, according to an exemplary embodiment of the disclosure.

Controller 130 is illustrated in greater detail in FIG. 2. FIG. 2 provides a block diagram of a network including a controller 130 that may be used with an infotainment exemplary system. Controller 130 may include 110 interface 144, processing unit 146, storage unit 148 and memory module 150. One or more of the components of controller 130 may be installed in user interface 128, mobile device 158, and/or in an on-board computer of vehicle 112.

I/O interface 144 may send and receive data between components of infotainment system 100, such as user interface 128 and database 126, and controller 130 via communication cables, wired or wireless networks such as radio waves, a nationwide cellular network, and/or a local wireless network (e.g., Bluetooth™ or WiFi, or other communication methods.

Controller 130 may also include storage unit 148 and/or memory module 150, which may be configured to store one or more computer programs that may be executed by controller 130 to perform functions of infotainment system 100. For example, storage unit 148 and/or memory module 150 may be configured to store GPS software configured to determine geographic positioning based on communication with satellites. Storage unit 148 and/or memory module 150 may also include software configured to calculate directions and estimated trip durations between two locations. Storage unit 148 and/or memory module 150 may also be configured to store data and/or look-up tables used by processing unit 146. For example, storage unit 148 and/or memory module 150 may be configured to store data, such as digital signatures pertaining to occupants related to vehicle 112 and associated data. Storage unit 148 and/or memory module 150 may also store software related to facial or voice recognition or to word or object identification (e.g., to identify objects and scenes external to or internal to vehicle 112).

Controller 130 may further include processing unit 146, which may be configured to generate and transmit command signals via I/O interface 144. Processing unit 146 may also be configured to select a subset of media content (e.g., one or more media tiles) from the media content stored in database 126.

Processing unit 146 may select the subset of media content based on one or more factors. In some embodiments, processing unit 146 may receive a command from an occupant via user interface 128. Such command may include selection of particular media content or instructions relating to the subset of media content selected by processing unit 146 (e.g., pause, fast forward, stop, skip). In the absence of an occupant media content selection or as a default, processing unit 146 may automatically select the subset of media content to be provided to the occupant via user interface 128.

Controller 130 may also provide multiple possible subsets of media content to a vehicle occupant via user interface 128, and the occupant may select one of the subsets of media content via user interface 128 or input device 129.

Processing unit 146 may also receive input from other components of infotainment system 100, vehicle 112, and from other sources. As shown in FIG. 2, controller 130 may be configured to receive data from or transmit data to database 126, user interface 128, and other inputs in vehicle 112, such as camera 131, as well as speakers, microphones, onboard computers, and mobile devices 158 associated with vehicle occupants. Controller 130 may also be configured to receive vehicle navigation data, such as the trip start time, trip starting point, trip ending point, traffic conditions, etc. The vehicle navigation data may be received from a global positioning device of vehicle 112, or via a network 152 from satellite 154 and/or traffic station 156. For example, satellite 154 may provide signals indicative of navigation data, and traffic station 156 may provide signals indicative of real-time traffic data.

In exemplary embodiments, controller 130 may select a subset of media content, such as a video game, from the media content stored in database 126. Database 126 may be coupled to controller 130 and may be configured to store media content (e.g., audio files and/or video files). The audio files stored in database 126 may include audio podcasts, audio books, radio, advertisements, and/or music. The video files may include video podcasts, television shows, internee videos, advertisements, and/or movies. Both audio and vehicle media may include learning materials, such as materials teaching a foreign language or other subject (e.g., sciences, history, mathematics, etc.), materials teaching test preparation (e.g., advanced placement test, professional certifications, etc.), and materials reviewing recently learned information.

Database 126 may also be configured to receive and store information pertaining to the media content, such as when the media content was last played, when the media content was last played by a particular occupant, the length of the media content, the genre or mood of the media content, the difficulty of the media content, and occupant preferences regarding the media content. In embodiments where database 126 stores information pertaining to the media content, the information may be dynamically or periodically updated by controller 130.

One or more components of controller 130 may be located locally in vehicle 112, as shown, or may alternatively in a mobile device, in the cloud or another remote location. Components of controller 130 may be in an integrated device, or distributed at different locations but may communicate with each other through network 152. For example, processing unit 146 may be a processor on-board vehicle 112, a processor inside mobile device 158, or a cloud processor. Similarly, database 126 may be cloud storage, a database of a mobile device 158, and/or a database of a third party content provider, such as iTunes™ or Spotify™. It is contemplated that processing unit 146 or database 126 may consist of multiple processors or databases in different locations. When located away from vehicle 112, database 126 may be coupled to controller 130 via network 152 such as radio waves, a nationwide cellular network, and/or a local wireless network (e.g., Bluetooth™ (or WiFi), or other communication methods.

Returning to FIG. 2, in exemplary embodiments, controller 130 receives vehicle navigation data, and selects a subset of media content from the media content stored in database 126 via processor 146 based on the vehicle navigation data. Processing unit 146 may be configured to use and/or process input received from components of vehicle 112 (e.g., a clock, onboard computer system, and/or GPS or navigation system) or from satellite 154 and/or traffic station 156 in order to select the subset of media content. For example, processing unit 146 may be configured to triangulate a current location of vehicle 112 based on data from a plurality of satellites 154 (e.g., latitude, longitude, and/or altitude) or may be configured to calculate a route and/or a trip duration associated with the route from the current location to one or more destinations based on a number of different variables, such as distances, speed limits, and/or real-time traffic. Controller 130 may also be configured to remember frequent destinations or routes. The media content is then provided to the vehicle occupant through user interface 128. Controller 130 may use the vehicle navigation data to select the subset of media content. For example, if the vehicle navigation data indicates that traffic conditions are poor, controller 130 may select soothing music. Similarly, if the vehicle navigation data indicates that the trip is beginning in the evening, controller 130 may select fast music or podcasts on pop culture topics in order to keep the potentially tired vehicle occupant engaged and awake. By way of further example, if traffic conditions become heavy, controller 130 may also cause user interface 128 to ask the vehicle occupant whether they would like to pause the infotainment system.

The vehicle navigation data may be dynamically updated and the subset of media content may be adjusted accordingly. For example, controller 130 may select two podcasts based on an estimated trip duration of an original route determined based on the vehicle navigation data. If vehicle 112 then travels in a direction that is inconsistent with the determined route, controller 130 may be configured to update the route and the estimated trip duration based on the current location, and may add media content (e.g., files) to the subset of media content that will be provided, or may remove the second podcast from the subset of media content and substitute different media content. As another example, controller 130 may move the occupant from a longer, more difficult level of a video game to an easier, quicker level if traffic conditions indicate the trip duration will be shorter than originally estimated. Similarly, if vehicle 112 travels in a direction that is inconsistent with an originally determined route, controller 130 may be configured to update the route and the estimated trip duration based on the new location, and may start another game or prompt the occupant to begin a longer game if the trip duration is estimated to be longer. Further, controller 130 may be configured to stop or pause the video game when a predetermined amount of time or a predetermined distance remains in the trip.

In addition, controller 130 may use the vehicle navigation data to determine one or more places of interest the vehicle is approaching, and may select a subset of media content based on the place of interest. For example, controller 130 may receive location information and, determine that vehicle 112 is approaching a historical marker. Controller 130 may then select a podcast concerning the historical event memorialized by the marker.

Further, controller 130 may be configured to alter the subset of media content when a predetermined amount of time or a predetermined distance remains in the trip. For example, the controller may select and provide a different subset of media content, such as a quiz on the earlier provided subset of media content (particularly when the subset included learning materials) to the vehicle occupant when the time remaining in the trip is less than a predetermined time period. Controller 130 may create the quiz (e.g., by randomly selecting material from previous lessons) or may use a pre-made quiz. The quiz may contain audio, video, still image, and text elements. In exemplary embodiments, controller 130 may also use vehicle navigation data to select the quiz (e.g., choosing an easier quiz in difficult traffic conditions or a more comprehensive quiz on Fridays following shorter quizzes throughout the week). Alternatively or in addition, controller 130 may prompt the occupant to take a quiz when a predetermined set of media content has been provided to the occupant, or may prompt the occupant to begin a quiz during a long learning material file or lesson if the learning material file or lesson is not complete when the occupant is nearing home. It is also contemplated that instead of generating a quiz, controller 130 may generate a song reinforcing concepts or vocabulary (e.g., in a foreign language) learned during a subset of media content or during a trip or other predetermined time period.

In exemplary embodiments, processing unit 146 of controller 130 may also be configured to determine the identity of one or more occupants of vehicle 112. In such embodiments, controller 130 may select the subset of media content based on the occupant's identity (e.g., preferences, media content previously provided to the occupant).

Processing unit 146 may be configured to determine the identity of the occupant through a variety of mechanisms. In some embodiments, processing unit 146 may be configured to determine the presence of a specific occupant based on a digital signature from mobile devices 158 associated with the vehicle occupant. The digital signature of these communication devices may include a determinative emitted radio frequency (RF), GPS, Bluetooth™, and/or WiFi unique identifier. Processing unit 146 may be configured to relate the digital signature to stored data including the occupant's name and relationship with vehicle 112.

In some embodiments, processing unit 146 may also be configured to determine the presence of an occupant within vehicle 112 by GPS tracking software of mobile devices 158. In some embodiments, vehicle 112 may be configured to detect mobile devices 158 upon connection to a local network (e.g., Bluetooth™ or WiFi).

In some embodiments, processing unit 146 may also be configured to recognize occupants of vehicle 112 by receiving inputs into user interface 128. For example, user interface 128 may be configured to receive direct inputs identifying the occupant.

User interface 128 may also be configured to receive biometric data (e.g., fingerprints) from occupants interacting with user interface 128. In some embodiments, processing unit 146 may be further configured to determine identity of the occupant by actuating one or more cameras or sensors within vehicle 112, such as camera 131 to capture an image and process the image with facial recognition software.

Controller 130 may be configured to identify occupants using combined methods to ensure accuracy. For example, processing unit 146 may determine the identity of an occupant by detecting a mobile device 158 and by actuating camera 131 because the occupant may be identified with a mobile device 158 and/or the resolution of images captured by camera 131 may not enable identification of the occupant.

In embodiments where controller 130 is configured to identify a vehicle occupant, controller 130 may select media content based on die identity of the occupant. For example, controller 130 may select (or generate and select) a quiz based on the learning level of the particular occupant. For example, controller 130 may determine the learning level of the occupant (e.g., based on previous media content provided to that occupant on a particular subject or information provided to database 126 from a third party such as a school or tutor), and select a subset of media content based on that learning level (e.g., providing the next lesson in a series of podcasts or choosing a math quiz covering information recently taught by a school or tutor). Similarly, if the vehicle occupant has only completed one foreign-language lesson previously, controller 130 may select a simple song in the foreign language to play for the occupant. If in contrast the vehicle occupant has completed many lessons in the foreign language, controller 130 may select a foreign-language radio program targeted for native speakers. Each time infotainment system 100 may provide additional vehicle content, controller 130 may update the learning level of the occupant and store the learning level, e.g., in database 126.

In some other embodiments, controller 130 may select e video game based on the identity of the occupant. For example, controller 130 may determine the skill level of the occupant (e.g., based on previous game experience or occupant input), and select a video game based on that skill level (e.g., choosing an easy or difficult level of the game). Each time system 100 may provide a video game, controller 130 may update the skill level of the occupant and store the skill level, e.g., in database 126. Controller 130 may additionally or alternatively select a video game based on the age or preferences of a particular occupant.

Controller 130 may also be configured to receive input based on the mood of an occupant and may select the subset of media content or video game based on the mood of the occupant. Processing unit 146 of controller 130 may be configured to determine the mood of one or move vehicle occupants through a variety of mechanisms. In some embodiments, processing unit 146 may receive direct input from a vehicle occupant regarding his mood (e.g., in response to a question (e.g., an audible prompt or a displayed question on user interface 128) which may issue when controller 130 recognizes heavy traffic conditions or when an occupant starts vehicle 112). In alternative embodiments, user interface 128 or additional sensors in vehicle 112 may also be configured to receive biometric data (e.g., temperature, facial expressions, tone of voice, presence of sweaty palms on a steering wheel or door handle, encephalogram sensors, etc.) from an occupant, determine the occupant's mood, and may select a subset of media content based on the vehicle occupant's mood. For example, if a vehicle occupant is unhappy, controller 130 may select a subset of media content associated with an "uplifting" attribute. Controller 130 may dynamically update the input relating to the mood of the occupant, and may alter the subset of media content if the occupant's mood changes. For example, if the occupant is struggling with learning materials, controller 130 may change the subset of media content to include learning materials appropriate for a more basic learning level, or may prompt the occupant to pause the module during a portion of the trip with heavy traffic.

It is contemplated that controller 130 may select the subset of media content based on multiple different factors. For example, processing unit 146 may base the selection of the subset of media content on both the occupant's identity and vehicle navigation data. For instance, processing unit 146 of controller 130 might determine that a vehicle occupant is a child, and may receive vehicle navigation data indicating that the vehicle trip is originating at a school. Based on this information, controller 130 may select learning materials. In exemplary embodiments, processing unit 146 may be configured to access media content provided by the school, and may select media content relating to what the child has learned recently, or what the child is scheduled to learn next in school. As another example, processing unit 146 of controller 130 might determine that a vehicle occupant is a child and that the trip duration is estimated to be 20 minutes. Based on this information, controller 130 may select an educational game at a level estimated to take 18 minutes. In addition, if a trip is very short (e.g., such that a game could not be finished), controller 130 may select a game based on the type of game and on the trip duration. For example, controller 130 may select a game where experience points are not lost when an occupant quits the game early.

It is also contemplated that infotainment system 100 may provide media content or video game in situations where multiple vehicle occupants are in vehicle 112. In some embodiments, each vehicle occupant may be associated with a particular user interface 128 through which a subset of media content is provided for the particular occupant. Controller 130 may select different subsets of media content or video games for each of the various user interfaces, and may select the subsets of media content or video games based on the same factor(s) for each user interface or based on one of more different factors.

Controller 130 may also provide the same subset of media content or video game to all occupants. Controller 130 may select a subset of media content based on factors other than occupant identity, or may assign priority to a particular vehicle occupant (e.g., the driver and base the subset of media content or video game on that occupant's identity. Controller 130 may also select the subset of media content based on the identities of multiple vehicle occupants. For example, where both adults and children are in vehicle 112, the subset of media content or video game selected by controller 130 may be learning material related to a language the whole family is learning, rather than the next segment of a podcast previously heard by only one of the vehicle occupants. Controller 130 may also receive input from the vehicle occupants regarding the desired difficulty level or type of media content that should be included in the subset of media content (e.g., via a poll provided by user interface 128). Similarly, controller 130 may select the media content or video game based on the number of vehicle occupants. For example, in an occupant-driven car with only one passenger, controller 130 may select a single player game.

Infotainment system 100 may also connect with home systems or systems in other vehicles. For example, system 100 may share information regarding an occupant's preferences or learning level with a home entertainment or infotainment system or a system used by the occupant in another vehicle. The information may, for example, be shared via network 152 or stored such that both system 100 and other systems may access and update the information, such as in a cloud or on a mobile device based on an occupant ID. System 100 may also connect with home systems or systems in other vehicles (e.g. via data shared in a cloud, Bluetooth™ exchanges via a mobile device 158, or WiFi), so that the occupant may, for example, complete a chapter of an audio book while driving and then be prompted by a home system to begin the next chapter after arriving home or may learn words in a foreign language while driving, and then see those words on a display associated with a bathroom mirror in the evening when brushing their teeth.

In exemplary embodiments, infotainment system 100 may further include a drive 160 coupled to a vehicle component, such as a seat 124. Controller 130 may be configured to generate a control signal based on the subset of media content selected or an occupant input to user interface 128 and cause the drive to alter the condition of the vehicle components in response to the control signal. For example, after selecting a podcast concerning the historical event, controller 130 may generate a control signal causing drive 160 to turn seat 124 so that the vehicle occupant is looking at the relevant locations. In addition, where user interface 128 is disposed in a particular position within cabin 122, drive 160 may cause seat 124 to move so that the user is facing a display of user interface 128. For example, in embodiments in which a display of user interface 128 is disposed on the ceiling of vehicle 112, controller 130 may generate a signal causing drive 160 to recline seat 124 so that the vehicle occupant is viewing the ceiling display.

As another example, if the game is a war game, controller 130 may generate a control signal causing drive 160 to "rumble" the seat (e.g., move it side to side or up and down) when bombs drop in the game. Drive 160 may also turn occupants' seats 124 to face one another when multiple occupants are playing a game. In addition, where user interface 128 is disposed in a particular position within cabin 122, drive 160 may cause seat 124 to move so that the occupant is facing a display of user interface 128. For example, in embodiments in which a display of user interface 128 is disposed on the ceiling of vehicle 112, controller 130 may generate a signal causing drive 160 to recline seat 124 so that the vehicle occupant is viewing the ceiling display. Similarly, drive 160 might be coupled to lights or a vehicle sound system and might cause lights to flash or project audio when events occur in the video game.

Figure 3:
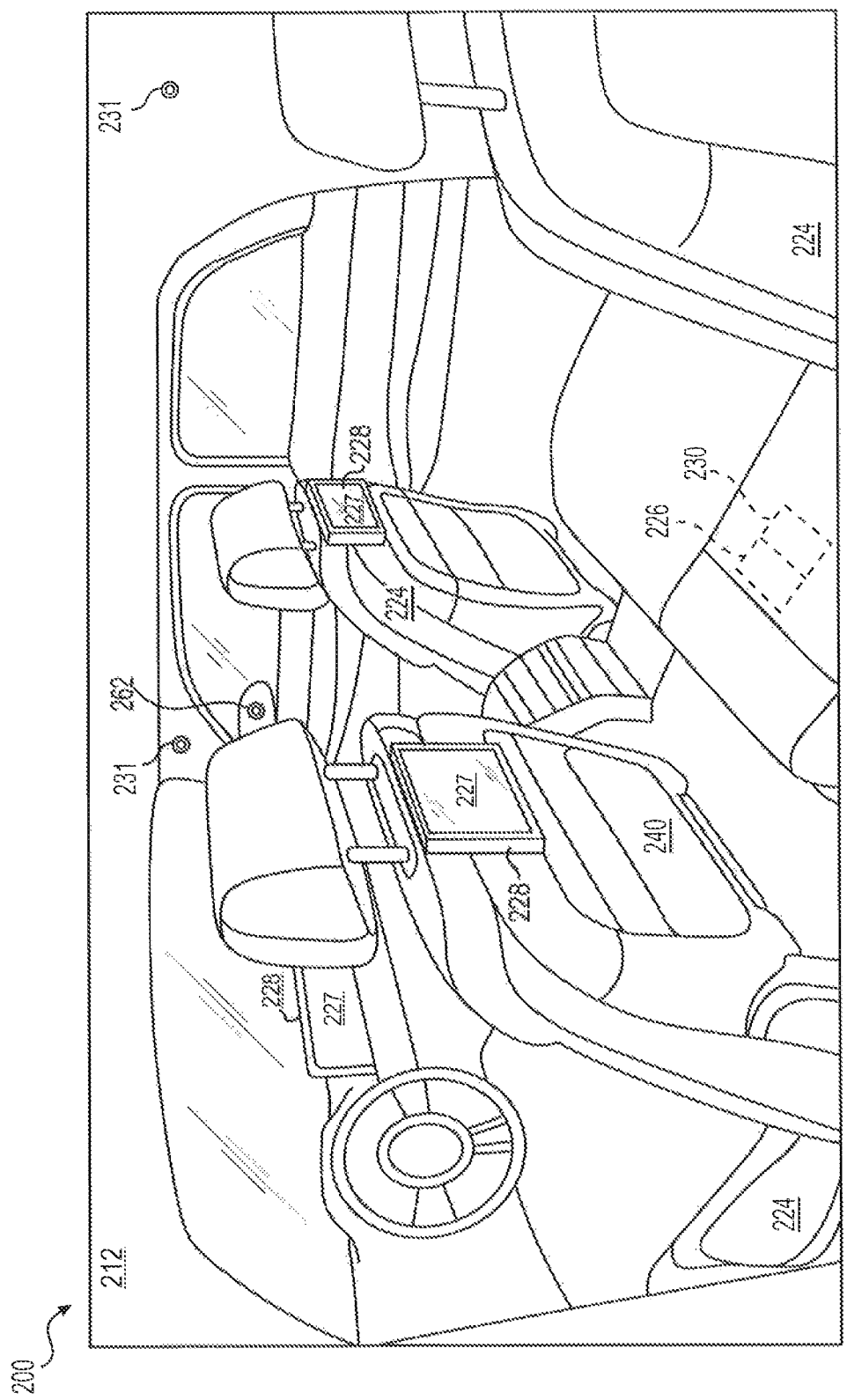
FIG. 3 is a diagrammatic illustration of a second exemplary infotainment system, according to an exemplary embodiment of the disclosure.

System 100 may also connect with other systems. For example, system 100 may share information regarding an occupant's preferences or skill level with a home system or a system used by the occupant in another vehicle. The information may, for example, be shared via network 152 or stored such that both system 100 and other systems may access and update the information, such as in a cloud or on a mobile device based on an occupant ID. System 100 may also connect with home systems or systems in other vehicles (e.g. via data shared in a cloud, Bluetooth™ exchanges via a mobile device 158, or WiFi), so that the occupant may, for example, resume a paused game on a home system after the conclusion of FIG. 3 is a diagrammatic illustration of a second exemplary infotainment system 200, according to an exemplary embodiment of the disclosure. Components similar to those found in infotainment system 100 are identified with similar reference numerals. To avoid duplicative description, only those components different from those found in infotainment system 100 are described in detail. In addition to the components depicted in FIG. 3, infotainment system 200 may include one or more of the features of infotainment system 100.

As shown, infotainment system 200 includes sensor 262 disposed on the exterior of vehicle 212. Sensor 262 may be disposed on the interior or the exterior of vehicle 212. Sensors 262 may sense temperature or other data, or sensor 262 may be a camera and/or microphone. In this embodiment, processing unit 146 (not shown) of controller 230 may be configured to receive an input from sensor 262 via I/O interface 144 (not shown), and may use the input to detect a scene in the proximity of the vehicle and select a subset of media content from the media content stored in database 226 based on the subject matter of the scene. For example, controller 230 may detect that pedestrians in the proximity of vehicle 212 are carrying umbrellas, and may select a weather report.

By way of further example, processing unit 146 may also use word or object identification software stored in storage unit 148 (not shown) and/or memory module 150 (not shown) to recognize a movie theater (or other object) in the proximity of vehicle 212, and may select a subset of media content that relates to the object (e.g., a podcast on movie history). In exemplary embodiments, controller 230 may select the object of interest from a number of objects in the proximity of vehicle 212 based on objects previously selected, occupant identity, location, and/or date and time.

For example, if the vehicle occupant is a student learning biology, controller 230 may provide information about birds or animals in the proximity of vehicle 212. By way of further example, during Women's History Month, controller 230 might select content related to Amelia Earhart when an airport is in the proximity of vehicle 212. Alternatively, controller 230 may cause user interface 228 to play an audio file stating the word for "movie theater" in a foreign language and could show a picture of a movie theater on user interface 128. In exemplary embodiments in which controller 230 is further configured to identify a vehicle occupant, as described with respect to infotainment system 100, controller 230 may store information regarding the words learned by a particular vehicle occupant and include them in a quiz at the conclusion of a predetermined time period (e.g., at the end of a trip or the end of a week). It is contemplated that a vehicle occupant may select a mode for controller 130 (e.g., a history mode or a language mode) such that controller 130 consistently identifies, for example, historical interest or identities objects in a foreign language during a trip.

Figure 4:
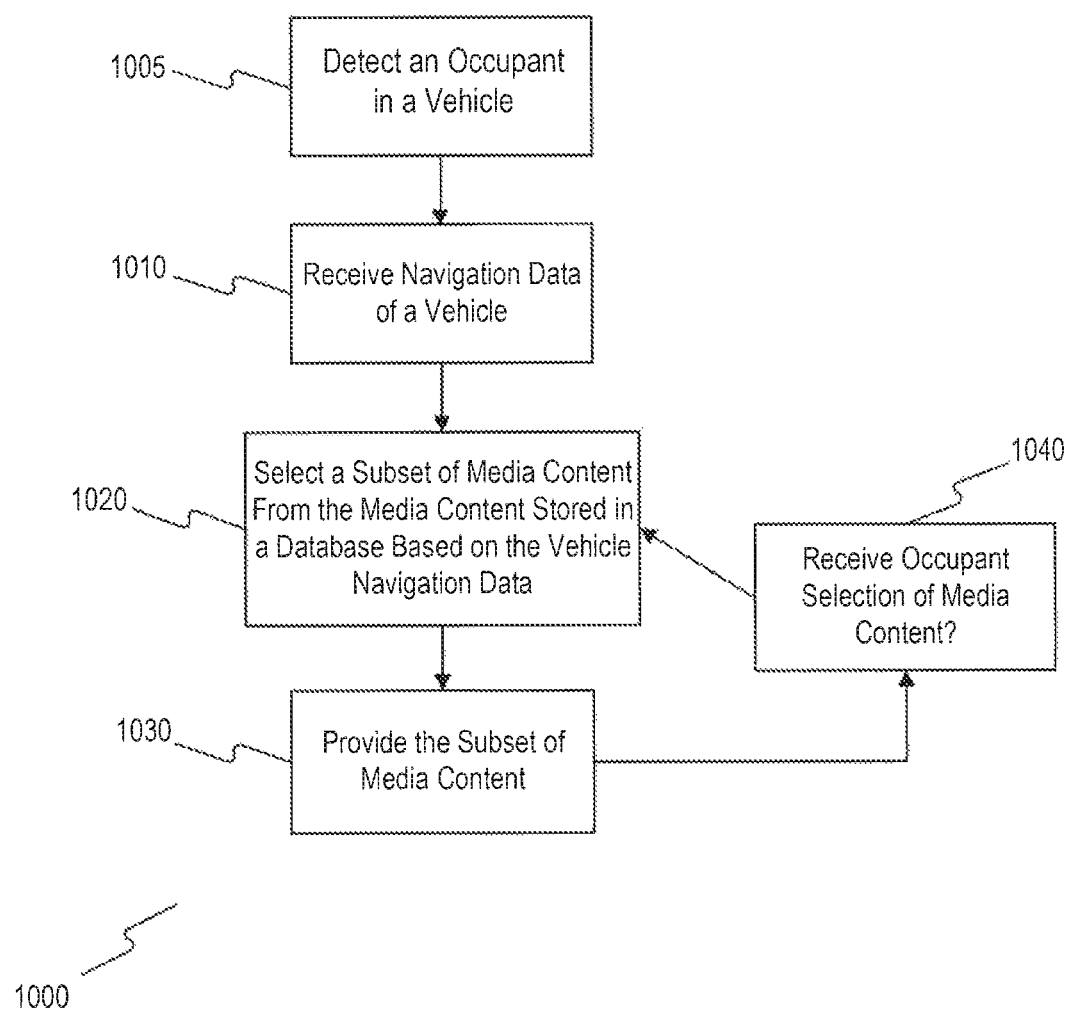
FIG. 4 is a flowchart illustrating an exemplary process that may be performed by the first exemplary infotainment system, according to an exemplary embodiment of the disclosure.

FIG. 4 is a flowchart illustrating an exemplary process 1000 that may be performed by the first exemplary infotainment system 100, according to an exemplary embodiment of the disclosure. In Step 1005, system 100 may detect an occupant of vehicle 112. System 100 may detect the occupant based on biometric inputs, camera 131 in vehicle 112, detecting a mobile device 158 associated with the occupant or by other previously described techniques.

In Step 1010, one more components of infotainment system 100 may receive navigation data of vehicle 112. Step 1010 may be initiated based on a number of different prompts. For example, controller 130 may receive an input through user interface 128. In some embodiments, controller 130 may calculate directions from a current location to one or more destinations and calculate an estimated duration of the trip. Controller 130 may, continually or intermittently, update the directions and estimated trip duration based on a current location of vehicle 112. Controller 130 may also determine landmarks, cities, and/or towns based on the current location, destination, and/or along the trip. Controller 130 may determine businesses (e.g., retailers or restaurants) based on the current location, destination, and/or along the trip.

In Step 1020, one or more components of infotainment system 100 may select a subset of media content from the media content stored in database 126 based on the vehicle navigation data. In some embodiments, controller 130 may select a subset of media content based on the subset of media content having a combined duration less than or equal to the estimated trip duration. For example, according to an estimated trip duration of 45 minutes, controller 130 may select two podcasts with a duration of 20 minutes each. Controller 130 may also maximize the duration of the subset of media content by minimizing the gap between the duration of the subset of media content and the estimated trip duration. For example, controller may select a music data file with duration of 45 minutes for the remaining 5 minutes of the estimated trip duration. Controller 130 may also select the subset of media content based on an identified vehicle occupant, or a place of interest vehicle 112 is approaching. For example, controller 130 may select the subset of media content based on preferences of the occupant or controller 130 may select a podcast about a city and/or a landmark of the city indicated as a destination of the navigation data.

In Step 1030, one or more components of infotainment system 100 may provide the subset of media content. Media content may be provided by user interface 128, as depicted in FIG. 1, including, e.g., a display on-board vehicle 112, or a personal device, such as mobile device 158, carried by the occupant into vehicle 112.

Controller 130 may dynamically update the subset of media content based on the current location of vehicle 112, a change in estimated trip duration, and/or an occupant selection. For example, in Step 1040, controller 130 may receive an occupant selection of media content. The selection may include the occupant skipping media content of the subset of media content. The selection may also include the occupant's desire to select a particular subset of media content. Controller 130 may then update the subset of media content based on the selection. For example, controller 130 may re-select (Step 1020) the subset of media content based on the occupant input of Step 1040 in order to include the media content selected by the occupant. Step 1040 may be a passive step in that controller 130 may continually update the subset of media content in the absence of an occupant selection. In some embodiments, controller 130 may continually update the navigation data and the subset of media content based on a change in location and/or a change in estimated trip duration. For example, controller 130 may add/subtract media content from the subset of media content accordingly.

Figure 5:
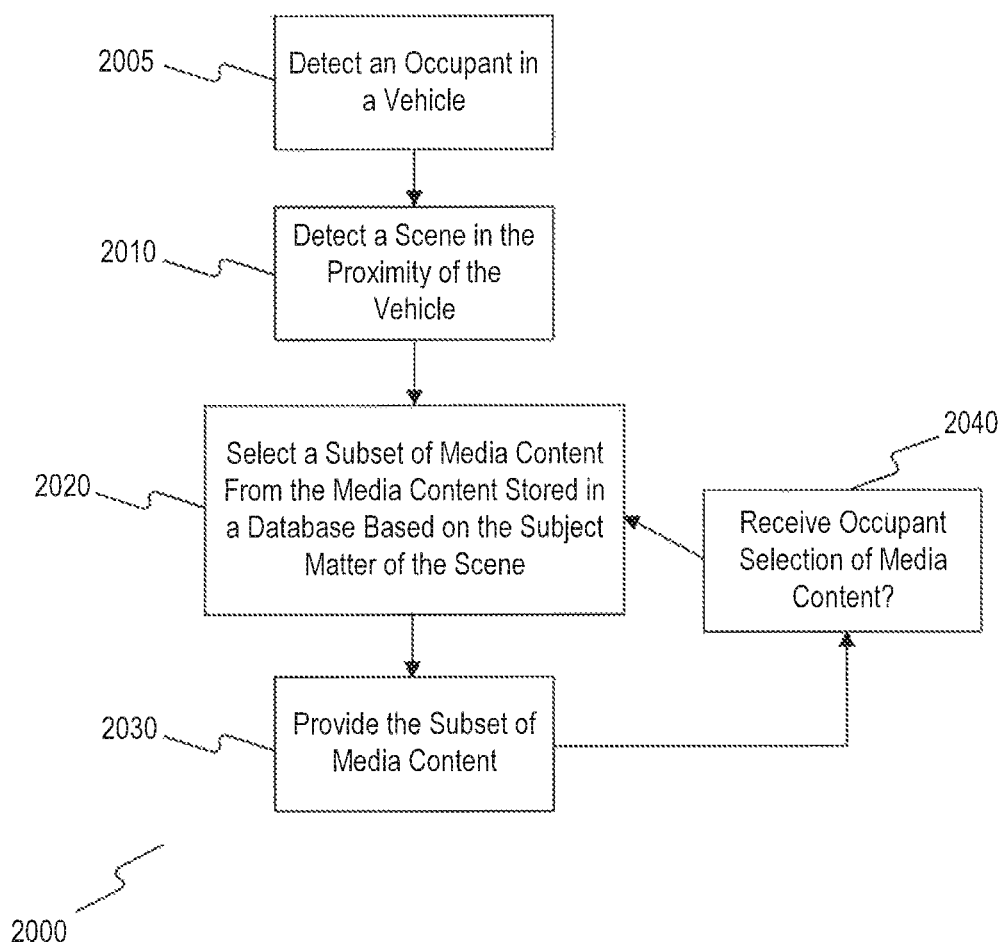
FIG. 5 is a flowchart illustrating an exemplary process that may be performed by the second exemplary infotainment system, according to an exemplary embodiment of the disclosure.

FIG. 5 is a flowchart illustrating an exemplary process that may be performed by the second exemplary infotainment system, according to an exemplary embodiment of the disclosure, Steps similar to those found in process 1000 are identified with similar reference numerals. To avoid duplicative description, only those steps different from those found in process 1000 are described in detail. It is contemplated that exemplary systems may perform all or parts of both process 1000 and/or process 2000.

In Step 2005, system 200 may detect an occupant of vehicle 212.

In Step 2010, one or more components of infotainment system 200 may detect a scene in the proximity of vehicle 212. The scene may be detected, for example, by a sensor 262, which may be located on the exterior or the interior of vehicle 212, and may sense temperature or other data. Sensor 262 may be a camera or microphone, and may be configured to send input to controller 230.

In Step 2020, one or more components of infotainment system 200 may select a subset of media content from the media content stored in database 126 based on the subject matter of the scene. For example, controller 230 may receive input from sensor 262 indicating that a music festival is occurring in the proximity of the vehicle, and may select a live stream of the music festival.

In Step 2030, one or more components of infotainment system 200 may provide the subset of media content. In exemplary embodiments, in Step 2040, controller 230 may receive an occupant selection of media content and controller 230 may then update the subset of media content based on the selection.

Figure 6:
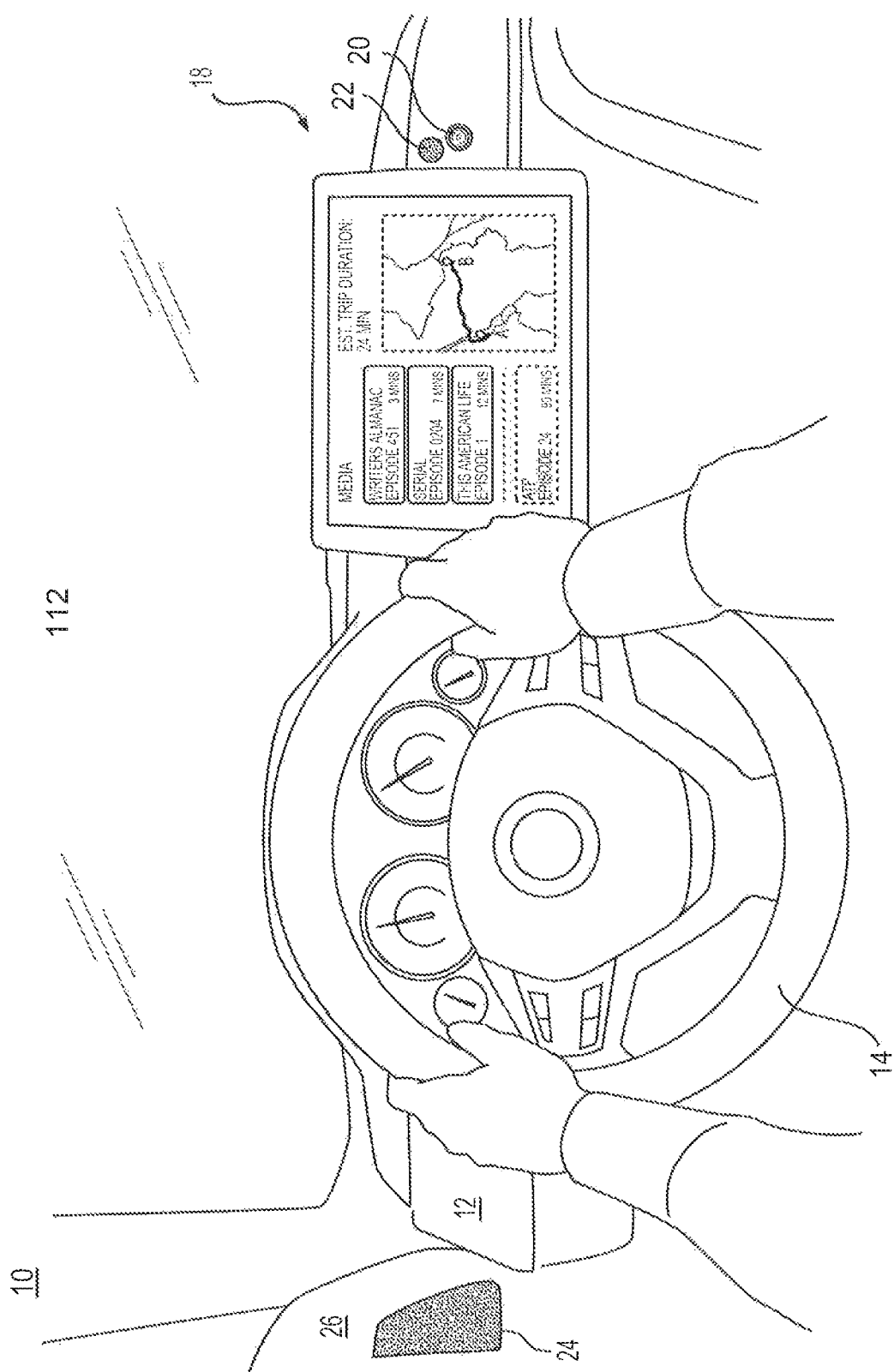
FIG. 6 is a diagrammatic illustration of a third exemplary infotainment according to an exemplary embodiment of the disclosure.

FIG. 6 illustrates a third exemplary infotainment system 10, according to an exemplary embodiment of the disclosure. As illustrated in FIG. 6, infotainment system 10 may include a dashboard 12 that may house or support a steering wheel 14, a user interface 18, one or more cameras 20, and a microphone 22. Vehicle 10 may also include a number of speakers 24, for example, installed in a door 26.

User interface 18 may be configured to receive input from the user and transmit data. For example, user interface 18 may have a display including an LCD, an LED, a plasma display, or any other type of display. User interface 18 may also provide a graphical user interface (GUI) presented on the display for user input and data display. User interface 18 may further include input devices, such as a touchscreen, a keyboard, a mouse, and/or a tracker ball. User interface 18 may include a housing having grooves containing the input devices and configured to receive individual fingers of the user. User interface 18 may be configured to receive user-defined settings. User interface 18 may also be configured to receive physical characteristics of common occupants (e.g., children) of a back seat.

User interface 18 may be configured to display navigation data of vehicle 112. For example, user interface 18 may be configured to display maps based on a current location of vehicle 112 (e.g., Point A depicted in the map on FIG. 6), User interface 18 may also be configured to receive user input of one or more desired destinations (e.g., Point B). User interface 18 may be further configured to display directions for a trip (e.g., from Point A to Point B) and a trip duration estimate based on variables, such as distances, speed limits, and real-time traffic. User interface 18 may also be configured to display local landmarks, cities, and/or towns relative to the current location, destination(s), and/or the route of the trip.

User interface 18 may be configured to provide a display of media data and transmit the media data through components of vehicle 10. For example, user interface 18 may be configured to display representations of media data retrieved from a database, and may arrange the media data in playlists. User interface 18 may also be configured to transmit audio through speakers 24, and video through its own display or other displays throughout vehicle 10. User interface 18 may include a separate controller configured to process data and/or may be used in conjunction with a controller 130 (depicted in FIG. 2) configured to perform other functions of vehicle 112.

Camera(s) 20 may include any device configured to capture videos and/or images of the interior of vehicle 112 and generate a signal to be processed to visually detect the presence of occupants of vehicle 112. For example, camera(s) 20 may be used in conjunction with image recognition software, such that the software may distinguish a person from inanimate objects, and may determine an identity of certain people based on physical appearances. In some embodiments, the image recognition software may include facial recognition software and may be configured to recognize facial features and determine the age (e.g., by determining size and facial features) of occupants based on the videos or the images. Camera(s) 20 may be configured to be adjusted by a motor (not shown) to improve a video or an image of the occupant. For example, the motor may be configured to tilt camera 20 in a horizontal and/or vertical plane to substantially center the occupant(s) in the frame. The motor may also be configured to adjust the focal point of the camera(s) 20 to substantially focus on the facial features of the occupant(s).

Camera(s) 20 may be in a number of positions and at different angles to capture video or images of the driver and/or other occupants. For example, a camera 20 may be located on dashboard 12 to capture an image of facial features of an occupant sitting in a front seat, as depicted in FIG. 6. Camera(s) 20 may, additionally or alternatively, be located in positions to better capture facial features of occupant(s) sitting in the back seat. For example, camera(s) 20 may be positioned in any number of positions, such as on steering wheel 14, a windshield, structural pillars, a ceiling, doors, a floor, and/or on seats of vehicle 10 in order to capture video or images of occupants. In some embodiments, vehicle 10 may, additionally or alternatively, include a dome camera positioned on the ceiling and configured to capture a substantially 360° image of the interior of vehicle 112.

Microphone 22 may include any structure configured to capture audio and generate audio signals of interior of vehicle 10. As depicted in FIG. 6, microphone 22 may be centrally located on dashboard 12 to capture audio. In some embodiments, microphone 22 may be configured to capture voice commands from an occupant in order to control functions of vehicle 10. For example, microphone 22 may be configured to receive voice commands to control navigation data and media data. Microphone 22 may receive verbal commands of desired destinations and/or routes. Microphone 22 may also be configured to receive verbal commands of user selection of media data and/or enable systems and methods of this disclosure.

Infotainment system 10 may include processing unit 146 (as shown in FIG. 2). Consistent with the embodiments disclosed in connection with FIG. 6, processing unit 146 may be configured to determine a geographic position of user interface 18. For example, processing unit 146 may be configured to lock onto a plurality of satellites 154 in order to triangulate a current location (e.g., Point A of FIG. 6) based on latitude, longitude, and/or altitude, for example, with global positioning systems (GPS). Processing unit 146 may also be configured to receive one or more destinations for a trip (e.g., Point B). In some embodiments, processing unit 146 may be configured to calculate a route from the current location to the destination(s) based on a number of different variables, such as distances, speed limits, and/or real-time traffic. Based on the calculated route and the received variables, processing unit 146 may be configured to estimate a duration of a trip from the current location to the destination(s). The route may include a number of segments. For example, processing unit 146 may be configured to calculate a first segment and a first estimate trip duration based on a first destination, and a second segment and a second estimated trip duration based on a second destination. The determination of the route(s) and the estimated trip duration(s) may be dynamic, such that the determination may continually change based on a current location of vehicle 112. For example, if vehicle 10 travels in a direction that is inconsistent with the determined route, controller 130 may be configured to update the route and the estimated trip duration based on the current location.

In some embodiments, processing unit 146 may be configured to operate one or more components of infotainment system 10 to determine the identity of one or more person(s) within an area, such as occupant(s) of vehicle 112. Processing unit 146 may be configured to determine the identity of the occupant(s) through a variety of mechanisms. In some embodiments, processing unit 146 may be configured to determine the presence of specific people based on a digital signature from mobile device 158. The digital signature of communication device 158 may include a determinative emitted radio frequency (RF), GPS, Bluetooth™, and/or WiFi unique identifier. Processing unit 146 may be configured to relate the digital signature to stored data including the person's name and the person's relationship with vehicle 112. In some embodiments, processing unit 146 may also be configured to determine the presence of people within vehicle 112 by GPS tracking software of mobile device 158. In some embodiments, vehicle 112 may be configured to detect mobile devices 80 upon connection to local network 152 (e.g., Bluetooth or WiFi). In some embodiments, processing unit 146 may also be configured to recognize occupants of vehicle 112 by receiving inputs into user interface 18. For example, user interface 18 may be configured to receive direct inputs of the identities of the occupants. User interface 18 may also be configured to receive biometric data (e.g., fingerprints) from occupants interacting with user interface 18. In some embodiments, processing unit 146 may be further configured to determine identities of occupants by actuating camera 20 to capture an image and process the image with facial recognition software. The one or more components of infotainment system 10 may be redundant to ensure accuracy. For example, infotainment system 10 may determine the identity of an occupant by detecting mobile device 158 and actuating camera 20 because not all occupants may be identified with a mobile device 158 and/or the resolution of images captured by camera 20 may not enable identification of the occupant.

Processing unit 146 may be configured to receive a user selection of media data. The user selection may be received through interaction with user interface 18, audio commands through microphone 22, and/or input from mobile device 158. The user selection may indicate desired output of a media data file. The user selection may also include the user indicating that they want to skip media data of the subset of media data. Processing unit 146 may be configured to dynamically select and/or update the subset of media data based on the user selection.

Processing unit 146 may also be configured to access media data stored in a number of different databases. The media data may embody any number of audio and/or video files stored in any number of different locations associated with an occupant. For example, the audio files may include audio podcasts, audio books, radio, advertisements, and/or music. The video files may include video podcasts, television shows, Internet videos, advertisements, and/or movies. In some embodiments, the media data may be stored in controller 130, for example, in storage unit 148 and/or memory module 150. In some embodiments, the media data may be stored in database 144 of vehicle 112 or a database of mobile device 158, and accessed by processing unit 146 though network 152. In some embodiments, the media data may be stored in a server of a database of a third party content provider, such as iTunes™ or Spotify™, and accessed by processing unit 146 through network 158. The third party content providers may also include businesses (e.g., retailers or restaurants) or advertising agents, and the media data may be accessed based on a current location, destinations, and/or the route of the trip. For example, businesses proximate to a current location, destinations, and/or the route of the trip may transmit media to processing unit 146 in order to advertise.

The accessing of the media data may be based on the identity of the occupant. For example, processing unit 146 may be configured to access media data from mobile device 158 associated with the identified occupant. Processing unit 146 may also be configured to access the occupant's accounts from third party content providers based on stored permissions. In some embodiments, processing unit 146 may be configured to access data related to the identified occupants and extract interests. For example, processing unit 146 may be configured to access music files stored in storage unit of mobile device 158 and associate the music files to a song, an artist, and/or genre of music. Processing unit 146 may also be configured to generate profiles for the occupant based on the accessed media data, including the interests. Processing unit 146 may be further configured to determine common interests, for example, by comparing the generated profiles of multiple occupants when they are occupying vehicle 112. In some embodiments, processing unit 146 may be configured to sort the provided subset of media data based on the occupants' generated profile.

Processing unit 146 may be configured to access metadata, and extract and save information based on each of the media data files. In some embodiments, processing unit 146 may be configured to determine whether the media data has been previously provided to the identified occupant. For example, processing unit 146 may be configured to access metadata to determine whether the occupant has listened to the audio files or viewed the video files. In some embodiments, processing unit 146 may be configured to determine the duration of the media data according to the metadata. In some embodiments, processing unit 146 may also be configured to determine the duration of predetermined segments of the media data according to metadata. For example, processing unit 146 may be configured to determine the durations of segments of media data (e.g., podcasts, audio books, and/or videos) between predetermined commercial breaks. In some embodiments, processing unit 146 may be configured to access and/or select media data indicated as a favorite according to metadata and/or prearranged playlists.

Processing unit 146 may be configured to determine one or more media selection criteria. The media selection criteria may be based on a number of different aspects of the navigation data, metadata, and the occupant. In some embodiments, the media selection criteria may be based on the media data having a duration less than or equal to an estimated trip duration. Processing unit 146 may be configured to factor in a user selection into the media selection criteria. For example, processing unit 146 may be configured to receive a user selection for media data and determine the duration of the selected media data. Processing unit 146 may then be configured to calculate the duration of the user selection into selection of the subset of media data. The media selection criteria may also be based on local landmarks, cities, and/or towns relative to the current location, destinations, and/or the route of the trip. In some embodiments, the user selection and the estimate trip duration may be altered, such that processing unit 146 may be configured to dynamically modify the media selection criteria.

Processing unit 146 may be configured to select a subset of the media data from the database based on the media selection criteria, navigation data, metadata, and the occupant. For example, processing unit 146 may be configured to select the media data based on it having not been previously provided (e.g., listened or viewed) to the occupant. Processing unit 146 may also be configured to make the selection based on the combined duration of the subset of media data being less than or equal to the estimated trip duration. Processing unit 146 may be further configured to maximize the duration of the subset of media data based on the estimated trip duration. Processing unit 146 may be configured to select a first subset of media data for a first segment of a trip, and a second subset of media data for a second segment of the trip. The subset of media data of the first and second segments of the trip may be based on the occupants of each segment. For example, if the first segment of the trip includes a parent dropping the kids off at school, and the second segment is the parent driving to work, processing unit 146 may be configured to select a first subset of media data for the first segment based on the parent and/or the kids, and a second subset of media data for the second segment based on the parent.

In some embodiments, processing unit 146 may be configured to select portions of the media data in the subset of media data. For example, processing unit 146 may be configured to include a segment of media data in the subset of media data, while excluding other segments of the same media data. For example, processing unit 146 may determine segments based on predetermined breaks (e.g., commercials) in the media data, in order to further granulate the duration of the media data. Processing unit 146 may also be configured to include different types of media data from different databases in the subset of media data. For example, processing unit 146 may be configured to select a combination of longer narrative types of media data (e.g., podcasts) and shorter non-narrative types of media data (e.g., music), in order to maximize the duration of the subset of media data relative to the estimated trip duration. Processing unit 146 may also select a subset of media data including narrative type media data from a storage unit of mobile device 158 and advertisement media from a server of a business based on the destination.

Processing unit 146 may be configured to sort the subset of media data. In some embodiments, processing unit 146 may be configured to sort the subset of media data based on duration. For example, processing unit 146 may be configured to sort the subset of media data in an order of increasing or decreasing duration. For instance, processing unit 146 may be configured to sort in descending duration in order to reduce the possibility of the trip ending during a longer segment of narrative type media data. Providing shorter non-narrative types of media data (e.g., music) at the end of the trip would increase the chances of ending the trip during a break in the media data.

Storage unit 148 and/or memory module 150 may be configured to store one or more computer programs that may be executed by controller 130 to perform functions of infotainment system 10. For example, storage unit 148 and/or memory module 150 may be configured to store GPS software configured to determine geographic positioning based on communication with satellites 154. Storage unit 148 and/or memory module 150 may also include software configured to calculate directions and estimated trip durations between two locations. Storage unit 148 and/or memory module 150 may also be configured to store data and/or look-up tables used by the processing unit. For example, storage unit 148 and/or memory module 150 may be configured to store data, such as digital signatures pertaining to people related to vehicle 112 and associated media data.

Figure 7:
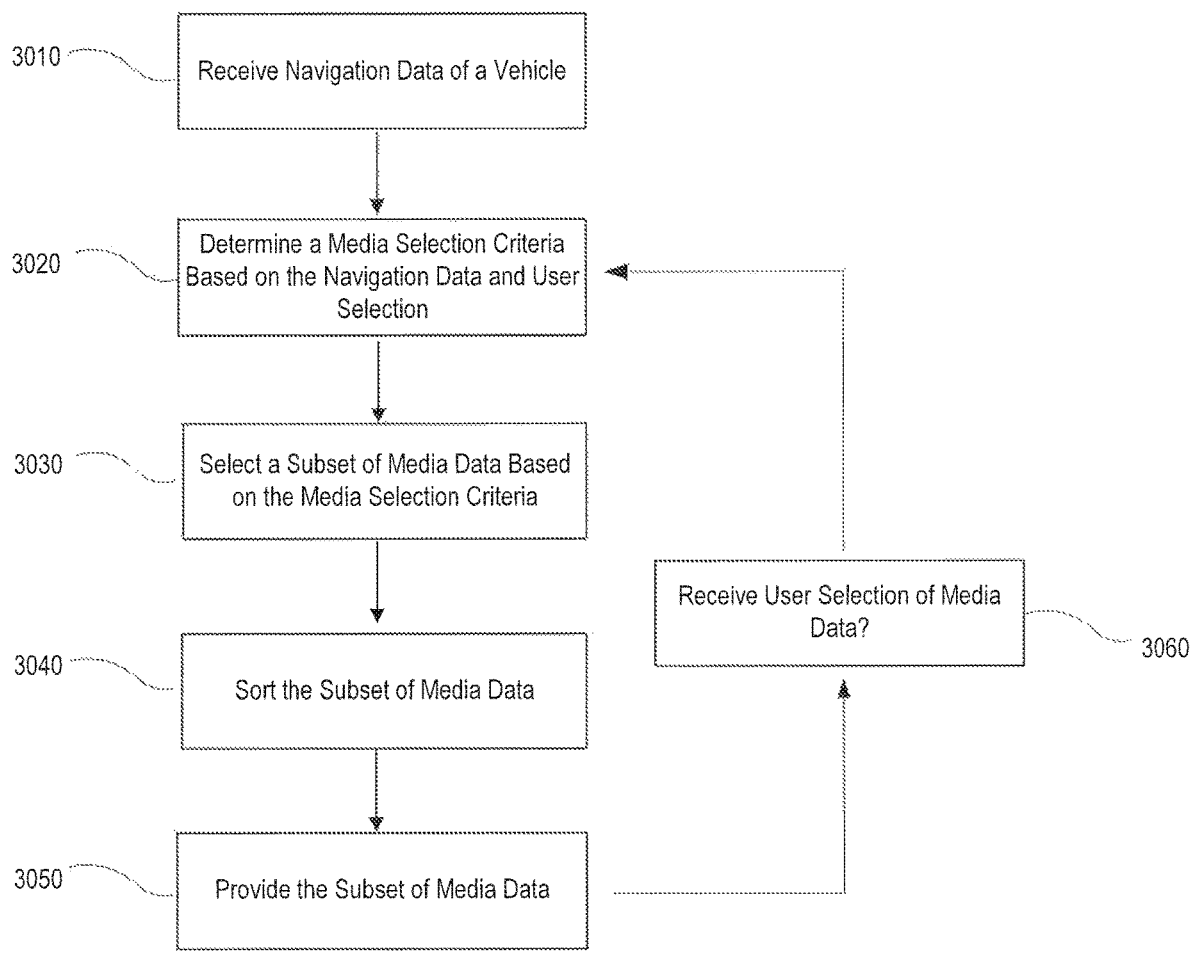
FIG. 7 is a flowchart illustrating an exemplary process that may be performed by the third exemplary infotainment system, according to an exemplary embodiment of the disclosure.

FIG. 7 is a flowchart illustrating an exemplary process 3000 that may be performed by the third exemplary infotainment system, according to an exemplary embodiment of the disclosure. In Step 3010, one or more components of infotainment system 10 may receive navigation data of vehicle 112. Step 3010 may be initiated based on a number of different prompts. For example, controller 130 may receive an input through user interface 18 and/or receive voice commands via microphone 22 determinative of one or more desired destination(s). In some embodiments, controller 130 may calculate directions from a current location to the destination(s) and calculate an estimated duration of the trip. Controller 130 may, continually or intermittently, update the directions and estimated trip duration based on a current location of vehicle 112. Controller 130 may also determine landmarks, cities, and/or towns based on the current location, destination, and/or along the trip. Controller 130 may determine businesses (e.g., retailers or restaurants) based on the current location, destination, and/or along the trip.

In Step 3020, one or more components of infotainment system 10 may determine a media selection criteria based on the navigation data. The media selection criteria may include the estimated trip duration. The media selection criteria may also include the current location, destination, and/or trip. Controller 130 may dynamically update the media selection criteria based on a user selection. For example, if the estimated trip duration is 45 minutes and the user selects a media file having a duration of 10 minutes, controller 100 may determine the media selection criteria may be based on the remaining 35 minute duration.

In Step 3030, one or more components of infotainment system 10 may select a subset of the media data based on the media selection criteria. In some embodiments, controller 130 may select a subset of media data based on the subset of media data having a combined duration less than or equal to the estimated trip duration. For example, according to an estimated trip duration of 45 minutes, controller 130 may select two podcasts with a duration of 20 minutes each. Controller 130 may also maximize the duration of the subset of media data by minimizing the gap between the duration of the subset of media data and the estimated trip duration. For example, controller may select a music data file with duration of 4.5 minutes to last the remaining 5 minutes of the estimated trip duration. Controller 130 may also select the subset of media data based on an identified occupant. For example, controller 130 may select the subset of media data based on preferences of the occupant. Controller 130 may also select the subset of media data based on the current location, destination, and/or trip. For example, controller 130 may select a podcast about a city and/or a landmark of the city indicated as a destination of the navigation data.

In Step 3040, one or more components of infotainment system 10 may sort the subset of media data. In some embodiments, controller 130 may sort the subset of media data based on increasing or decreasing duration. For example, controller may sort the subset of media data in descending duration in order to reduce the likelihood of ending the trip during a longer segment of media data. Controller 130 may sort the subset of media data based on the determined identity of the occupant. Controller 130 may also sort the subset of media data to organize associated contents adjacent to each other. For example, controller 130 may sort the subset of media data based on artist/creator, for instance, by organizing episodes of podcasts in a numeric order.

In Step 3050, one or more components of infotainment system 10 may provide the subset of media data. Representations of the subset of media data may be displayed in user interface 18, as depicted in FIG. 6. Upon user selection, video media data of the subset of media data may also be depicted on user interface 18, and audio media data of the subset of media data may be transmitted through speakers 24.

Controller 140 may dynamically update the subset of media data of method 3000 based on the current location of vehicle 112, a change in estimated trip duration, and/or a user selection. For example, in Step 3060, controller 130 may receive a user selection of media data. The user selection may include the user skipping media data of the subset of media data. The user selection may also include the user's desire to output a specific media file. Controller 130 may then update the subset of media data of Steps 3020-3050 based on the user selection. For example, controller 130 may re-select (Step 3030) and/or re-sort (Step 3040) the subset of media data based on the user input of Step 3060. The re-sorting may be based on a remaining duration after a user selection was received in Step 3060. Step 3060 may be a passive step in that controller 130 may continually update the subset of media data in the absence of a user selection. In some embodiments, controller 130 may continually update the navigation data and the subset of media data based on a change in location and/or a change in estimated trip duration. For example, controller 130 may add/subtract media data from the subset of media data accordingly.

Figure 8:
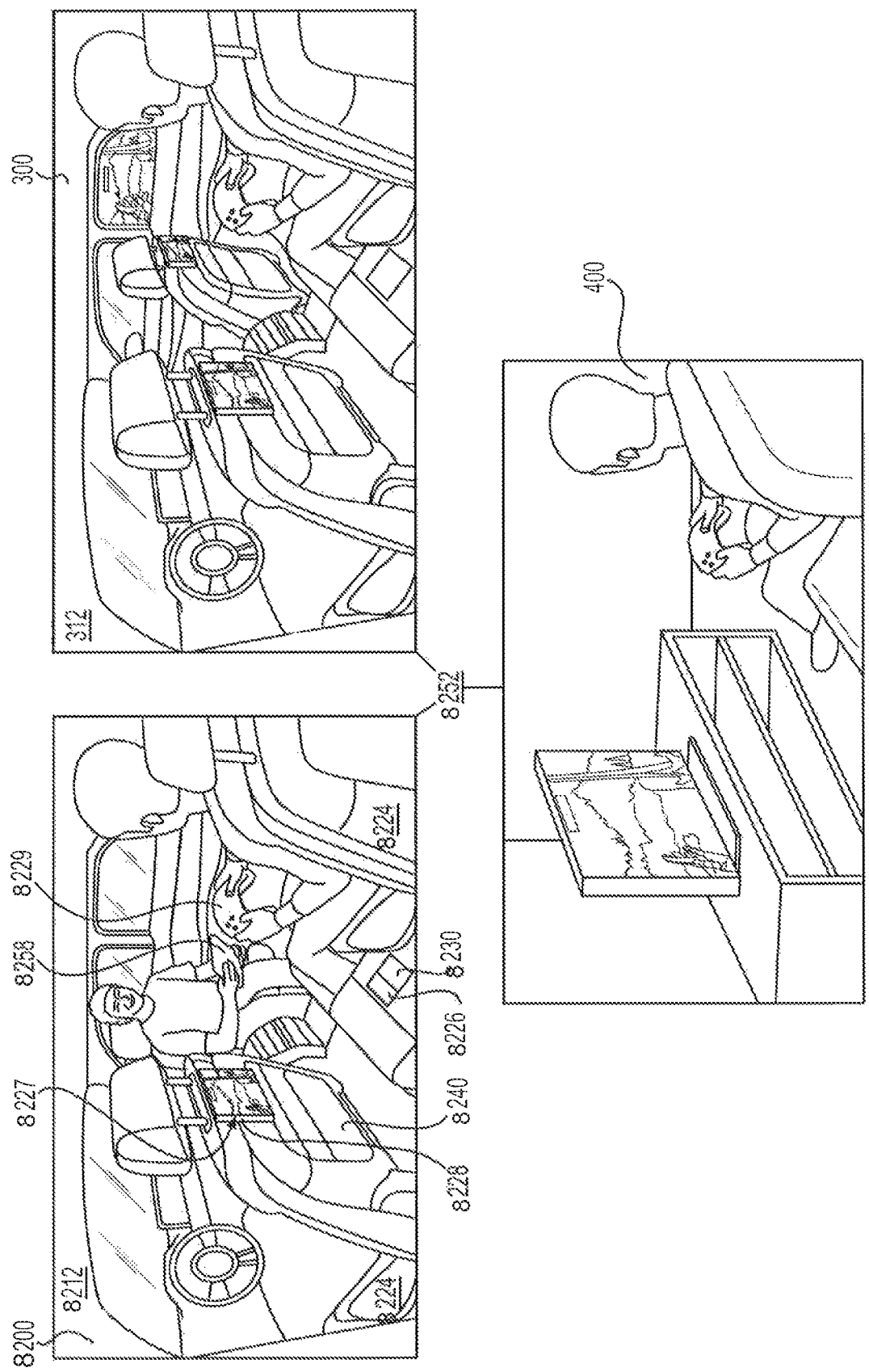
FIG. 8 is a diagrammatic illustration of a fourth exemplary infotainment system, according to an exemplary embodiment of the disclosure.

FIG. 8 is a diagrammatic illustration of a fourth exemplary system for providing a video game that has multiple players, according to an exemplary embodiment of the disclosure. Components similar to those found in system 100 are identified with similar reference numerals. To avoid duplicative description, only those components different from those found in system 100 are described in detail. In addition to the components depicted in FIG. 8, system 8200 may include one or more of the features of system 100.

As shown, system 8200 may connect to other vehicle and home systems. System 8200 may be connected to a system 300 of vehicle 312 such that an occupant may play a game with a player in vehicle 312. System 300 may be similar to vehicle system 200 or may be different, and system 8200 and system 300 may be connected via a network 252. System 8200 may receive or exchange vehicle navigation data and/or information regarding occupant mood and/or identity with system 300, and controller 8230 of system 8200 may select the video game additionally based on the identity of an occupant-player located in vehicle 312 or their estimated trip length. For example, if vehicle 8212 has an estimated trip duration of 20 minutes and vehicle 312 has an estimated trip duration of 15 minutes, controller 8230 may select a video game estimated to take 15 minutes or less, so that the game may be completed before the player in vehicle 312 completes his trip. In addition, controller 8230 may select a game that both the player in vehicle 8212 and the occupant of vehicle 8230 may access (e.g., a game available on an operating system or console that both have installed).

Controller 8230 may process vehicle navigation data from multiple vehicles, and may select a player from another vehicle fir an occupant of vehicle 8212 to play a video game with. Controller 8230 may select the player from the available players by selecting the player having the most similar estimated trip length as the occupant of vehicle 8212, or by selecting the player based on the preferences of the vehicle occupant. In some embodiments, controller 8230 may notify the occupant of vehicle 8212 of whether other players are available to play a video game. Controller 8230 may provide a list of available players and their estimated trip durations to the vehicle occupant via user interface 8228, and may allow the vehicle occupant to select a particular opponent or teammate to play with.

Similarly, system 8200 may be additionally or alternatively connected via network 8252 to a home system 400 or any other stationary or mobile system remote from vehicle 8212. Based on the estimated trip duration, system 8200 may send a signal to home system 400 inviting another player to play a game that will take a certain amount of time and may be completed before the vehicle occupant's trip is completed. In exemplary embodiments, system 8200 may provide vehicle navigation data to system 400 (or similarly, to system 300) and may generate a map that may be displayed to the other player indicating where the occupant of vehicle 8212 is, and/or estimating their trip duration.

Figure 9:
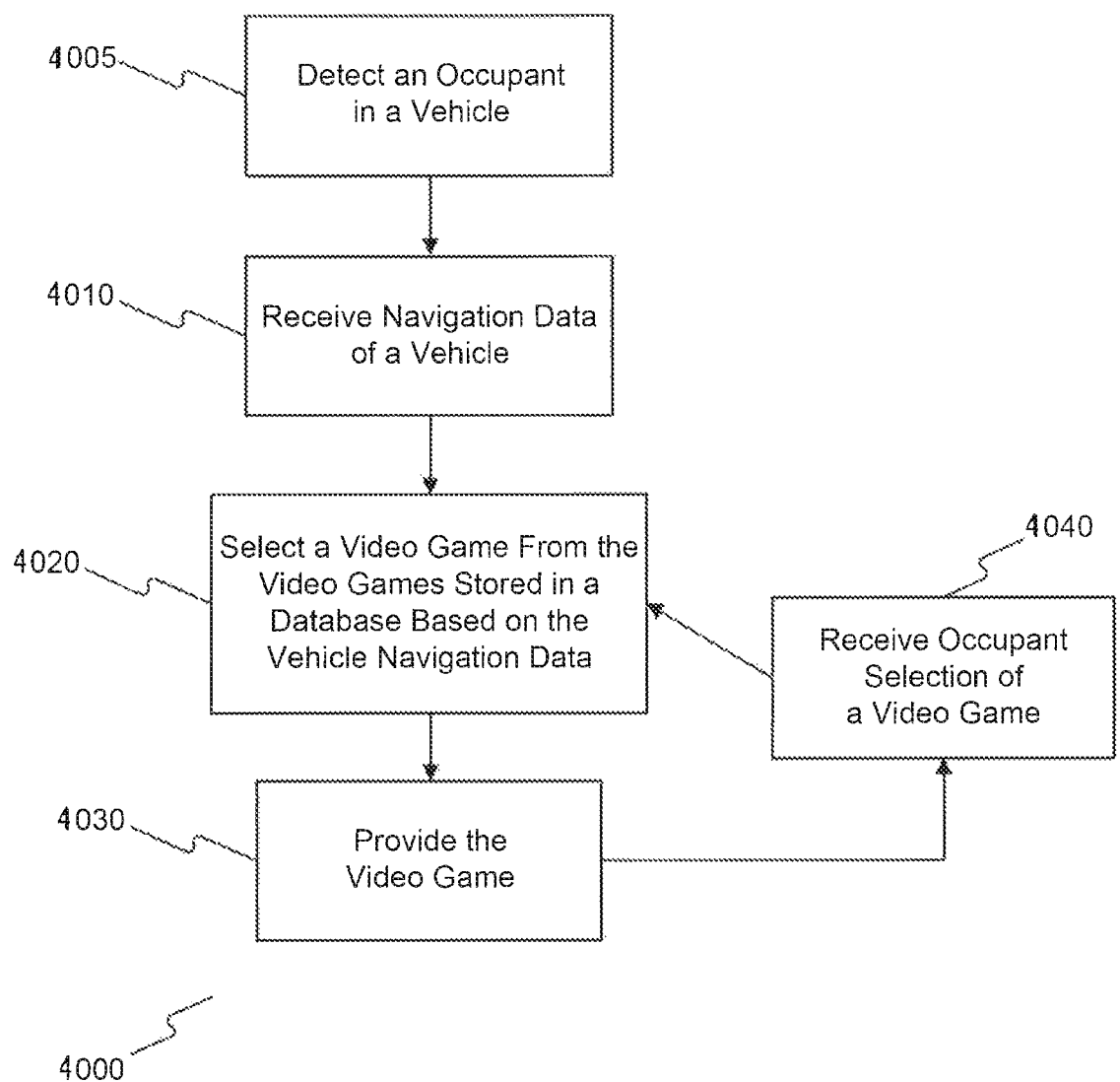
FIG. 9 is a flowchart illustrating an exemplary process that may be performed by the fourth exemplary infotainment system, according to an exemplary embodiment of the disclosure.

FIG. 9 is a flowchart illustrating an exemplary process 4000 for providing a video game, according to an exemplary embodiment of the disclosure. In Step 4005, system 100 may detect an occupant of vehicle 112. System 100 may detect the occupant based on biometric inputs, camera 131 in vehicle 112, detecting a mobile device 158 associated with the occupant, or by other previously described techniques.

In Step 4010, one or more components of system 100 may receive navigation data of vehicle 112. Step 4010 may be initiated based on a number of different prompts. For example, controller 130 may receive an input through user interface 128. In some embodiments, controller 100 may calculate directions from a current location to the destination(s) and calculate an estimated duration of the trip. Controller 130 may, continually or intermittently, update the directions and estimated trip duration based on a current location of vehicle 112.

In Step 4020, one or more components of system 100 may select a video game from the video games stored in database 126 based on the vehicle navigation data. In some embodiments, controller 130 may select a video games based on the video games having a duration less than or equal to the estimated trip duration. For example, according to an estimated trip duration of 45 minutes, controller 130 may select a medium difficulty game estimated to take 40 minutes. Controller 130 may also select the video game based on an identified vehicle occupant, the mood of a vehicle occupant, or vehicle navigation data associated with another mobile or stationary system, such as another vehicle or a home gaming system. For example, controller 130 may select the video game based on preferences of the occupant or controller 130 may select a video game that players in multiple vehicles may all complete before the end their respective trips.

In Step 4030, one or more components of system 100 may provide the selected video game. The game may be provided by user interface 128, as depicted in FIG. 1, including, e.g., a display on-board vehicle 112, or a personal device, such as mobile device 158, carried by the occupant into vehicle 112.

Controller 130 may dynamically update the video game based on, for example, a change in estimated trip duration, and/or an occupant selection. For example, in Step 4040, controller 130 may receive an occupant selection of a video game. The selection may include the occupant pausing a video game. The selection may also include the occupant's desire to select a particular video game. Controller 130 may then update the video game based, on the selection. For example, controller 130 may re-select (Step 4020) the video game based on the occupant input of Step 4040 in order to include the video game selected by the occupant. Step 4040 may be a passive step in that controller 130 may continually update the video game in the absence of an occupant selection. In some embodiments, controller 130 may continually update the navigation data and the video game based on a change in location and/or a change in estimated trip duration. For example, controller 130 may prompt the occupant to switch to a shorter or longer game, or adjust the level of difficulty of the game.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the a that various modifications and variations may be made to the disclosed infotainment system and related methods. Though described with reference to an infotainment system for a vehicle, the disclosure may also be applied to mobile devices outside of the vehicle context, such as smart phones, tablets, e-readers, and wearables (e.g., smart watches and smart glasses). Other embodiments will be apparent to those skilled in the art from consideration of the specification and practice of the disclosed infotainment system and related methods. It is intended that the specification and examples be considered as exemplary only, with a true scope being indicated by the following claims and their equivalents.

What is claimed is:

1. A system for providing media content to an occupant of a vehicle, the system comprising:
   a user interface configured to provide the media content to the occupant; and
   a controller coupled to the user interface and to a database storing media content, the controller being configured to:
   receive vehicle navigation data;
   select a subset of media content from the media content stored in the database based on the vehicle navigation data, the subset of media content including a video game;
   identify a player in the vehicle;
   select the video game based on the identity of the player and the vehicle navigation data, including selecting a video game difficulty level based on the identity of the player and selecting a video game scoring type based on the navigation data; and
   provide the subset of media content through the user interface.

2. The system of claim 1, wherein the controller is further configured to determine a trip duration using vehicle navigation data, and select the subset of media content based on the trip duration.

3. The system of claim 1, wherein the controller is further configured to determine a place of interest the vehicle is approaching, and select the subset of media content based on the place of interest.

4. The system of claim 1, wherein the subset of media content includes learning materials, and the controller is further configured to:
   determine a learning level of the occupant based on the identity of the occupant; and
   select the subset of media content based additionally on the learning level.

5. The system of claim 1, wherein the controller is configured to determine the time remaining before the vehicle reaches a destination location based on the vehicle navigation data, and provide a different subset of media content to the occupant when the determined time is less than a predetermined period of time.

6. The system of claim 4, wherein the controller is further configured to update the learning level of the occupant based on the set of media content consumed by the occupant, and store the learning level in the database.

7. The system of claim 1, wherein the user interface is part of a mobile device carried by the occupant in the vehicle.

8. The system of claim 1, wherein at least one of the database or the controller is in a cloud in communication with the vehicle.

9. The system of claim 1, wherein the controller is further configured to sort the subset of media data in an order of increasing or decreasing duration.

10. The system of claim 1, wherein the controller is further configured to sort the subset of media data such that media data of associated contents are provided adjacent to each other.

11. The system of claim 1, wherein the controller is further configured to:
- identify a second player in a second vehicle; and
- receive vehicle navigation data associated with the second vehicle; and
- select the video game based additionally on the vehicle navigation data associated with the second vehicle.

12. A method for providing media content to an occupant of a vehicle, the method comprising:
- receiving vehicle navigation data;
- selecting a subset of media content from media content stored in a database based on the vehicle navigation data, the subset of media content including a video game;
- identifying a player in the vehicle;
- selecting the video game based on the identity of the player and the vehicle navigation data, including selecting a video game difficulty level based on the identity of the player and selecting a video game scoring type based on the navigation data; and
- providing the subset of media content through the user interface.

13. The method of claim 12, wherein the subset of media content includes learning materials and the method further includes determining a learning level of the occupant based on the identity of the occupant, and selecting the subset of media content based additionally on the learning level.

* * * * *